United States Patent
Strauss

(10) Patent No.: US 10,344,805 B1
(45) Date of Patent: Jul. 9, 2019

(54) FLEXURAL TORQUE LIMITER

(71) Applicant: X Development LLC, Mountain View, CA (US)

(72) Inventor: Marc Strauss, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 440 days.

(21) Appl. No.: 15/133,151

(22) Filed: Apr. 19, 2016

(51) Int. Cl.
F16D 7/04 (2006.01)
F16D 7/02 (2006.01)

(52) U.S. Cl.
CPC ................... F16D 7/021 (2013.01)

(58) Field of Classification Search
CPC ...................................... F16D 7/021
USPC .............................. 464/37, 41, 42
See application file for complete search history.

(56) References Cited

U.S. PATENT DOCUMENTS

| | | | | |
|---|---|---|---|---|
| 5,000,721 A | * | 3/1991 | Williams | F16D 7/048 464/37 |
| 5,090,532 A | * | 2/1992 | Bich | F16D 7/048 464/37 |
| 7,621,815 B2 | * | 11/2009 | Bosserdet, Jr. | F16D 7/048 464/37 |

FOREIGN PATENT DOCUMENTS

| | | | | |
|---|---|---|---|---|
| GB | 661643 | * | 11/1951 | 464/37 |
| SU | 846861 | * | 7/1981 | 464/37 |

* cited by examiner

Primary Examiner — Greg Binda
(74) Attorney, Agent, or Firm — McDonnell Boehnen Hulbert & Berghoff LLP

(57) ABSTRACT

In example embodiments, a discrete torque limiter is described that includes a first cylindrical member including grooves along a longitudinal surface of the first cylindrical member. The discrete torque limiter includes a second cylindrical member arranged concentrically with the first cylindrical member. The second cylindrical member can be adapted to move independently around the first cylindrical member. The second cylindrical member can include flexural spokes with teeth that engage the grooves along the first cylindrical member when no torque is applied and that disengage from the grooves when a torque that exceeds a threshold torque is applied to the first cylindrical member or second cylindrical member.

12 Claims, 7 Drawing Sheets

FLEXURAL TORQUE LIMITER

BACKGROUND

The present disclosure relates to systems and apparatus for limiting torque utilizing flexural axial spokes. When a device experiences larger than expected torque, the excess torque placed on joints and components of the device can damage the device and prevent proper operation. The mechanical components connected at a joint can be protected by limiting the amount of torque sustained by the joint. Torque can be limited by disengaging the load on a joint when a threshold amount of torque is experienced. Current approaches for limiting torque applied to a mechanical joint include mechanisms that engage and disengage components through friction, use ball bearings situated in detents, or have breakable pins. These approaches can require many parts, be bulky and expensive, and require manual intervention to re-engage the load.

SUMMARY

Consistent with the present disclosure, systems and apparatuses are provided for limiting torque utilizing flexural axial spokes. A discrete torque limiter consistent with the present disclosure includes a first cylindrical member including grooves along a longitudinal surface of the first cylindrical member. Systems consistent with the present disclosure can also include a second cylindrical member arranged concentrically with the first cylindrical member. The second cylindrical member can be adapted to move independently around the first cylindrical member. The second cylindrical member can include flexural spokes with teeth that engage the grooves along the first cylindrical member when no torque is applied and that disengage from the grooves when a torque that exceeds a threshold torque is applied to the first cylindrical member or second cylindrical member.

In accordance with one exemplary embodiment, a system is provided for limiting torque utilizing flexural axial spokes. The system includes first and second cylindrical members arranged concentrically wherein the first cylindrical member includes a surface with longitudinal grooves and the second cylindrical member is adapted to rotate independently from the first cylindrical member. In these embodiments the second cylindrical member can further include flexural spokes with teeth that engage the grooves along the first cylindrical member when no torque is applied and that disengage from the grooves when a torque that exceeds a threshold torque is applied to the first cylindrical member or second cylindrical member.

In accordance with one exemplary embodiment, a means is provided for limiting torque utilizing flexural axial spokes. The system includes first and second cylindrical members arranged concentrically wherein the first cylindrical member includes groove means for engaging with the second cylindrical member and the second cylindrical member is adapted to rotate independently from the first cylindrical member. In these embodiments the second cylindrical member can further include flexural spoke means for engaging with the first cylindrical member when no torque is applied and for disengaging from the first cylindrical member when a torque that exceeds a threshold torque is applied to the first cylindrical member or second cylindrical member.

In accordance with one exemplary embodiment, a non-transitory computer readable medium storing instructions describing a discrete torque limiter, wherein the instructions are readable by one or more processors that are adapted to print three dimensional objects, wherein the printed objects are based on the instructions for the discrete torque limiter, and wherein the instructions include a description of the discrete torque limiter that comprises a first cylindrical member including grooves along a longitudinal surface of the first cylindrical member. In these embodiments, the instructions can further describe the discrete torque limiter having a second cylindrical member arranged concentrically with the first cylindrical member, the second cylindrical member being adapted to move independently around the first cylindrical member and including flexural spokes with teeth that engage the grooves along the first cylindrical member when no torque is applied and that disengage from the grooves when a torque that exceeds a threshold torque is applied to the first cylindrical member or second cylindrical member.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. Furthermore, the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION OF EXEMPLARY EMBODIMENTS

Figure 1A:
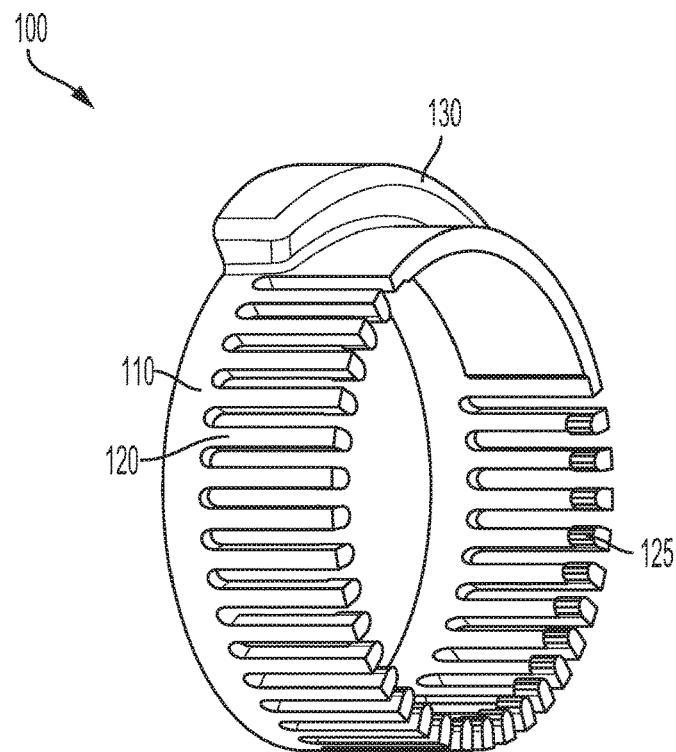
FIGS. 1A-1C are diagrams of components of an exemplary apparatus for implementing embodiments consistent with the present disclosure.

Embodiments of the present disclosure provide discrete systems and apparatus for limiting torque utilizing flexural axial spokes 120. Systems consistent with the present disclosure include a first cylindrical member 210 including grooves 220 along a longitudinal surface of the first cylindrical member 210. Systems consistent with the present disclosure can also include a second cylindrical member 110 arranged concentrically with the first cylindrical member 210. The second cylindrical member 110 can be adapted to move independently around the first cylindrical member 210. The second cylindrical member 110 can include flexural spokes 120 with teeth 125 that engage the grooves 220 along the first cylindrical member 210 when no torque is applied and that disengage from the grooves 220 when a torque that exceeds a threshold torque is applied to the first cylindrical member 210 or second cylindrical member 110.

The disclosed embodiments also provide flexion in the spokes 120 causing the teeth 125 to disengage when a torque that exceeds a threshold torque is applied. In some embodiments consistent with the present disclosure, the flexural spokes 120 are connected to the second cylindrical member 110 at one end of the spokes 120. In other embodiments consistent with the present disclosure, the flexural spokes 120 are connected to the second cylindrical member 110 at both ends of the spokes 120.

Yet another embodiment consistent with the present disclosure includes flexural spokes 120 that can be made with an engineering plastic. In some embodiments both the first cylindrical member 210 and second cylindrical member 110 can be made of the same material. In other embodiments, the first cylindrical member 210 and second cylindrical member 110 can be made using different materials. In examples embodiments, the first cylindrical member 210 surrounds the second cylindrical member 110. In other embodiments, the second cylindrical member 110 surrounds the first cylindrical member 210.

In some additional embodiments, the teeth 125 of the flexural spokes 120 can contact the grooves 220 at a constant angle throughout engagement. In some embodiments the teeth 125 contact the grooves 220 during engagement at a constant angle between 30° and 45°. In some embodiments consistent with the present disclosure, each side of the teeth 125 can contact the grooves at a different angle to enable disengagement at different threshold torques depending on the direction of rotation.

In additional embodiments consistent with the present disclosure the grooves 220 can be tapered. In these embodiments the threshold torque can depend on the location of contact between the teeth 125 and the grooves 220 and the location of contact can be changed by adjusting the longitudinal location of the second cylindrical member 110 relative to the first cylindrical member 220.

In another embodiment consistent with the present disclosure the system includes first and second cylindrical members arranged concentrically wherein the first cylindrical member 210 includes a surface with longitudinal grooves 220 and the second cylindrical member 110 is adapted to rotate independently from the first cylindrical member 210. In these embodiments the second cylindrical member 110 can further include flexural spokes 120 with teeth 125 that engage the grooves 220 along the first cylindrical member 210 when no torque is applied and that disengage from the grooves 220 when a torque that exceeds a threshold torque is applied to the first cylindrical member 210 or second cylindrical member 110. The flexural spokes 120 can be made of material with a variable stiffness based on the deflection of the spokes 120. In example embodiments, one or more additional cylindrical members adapted to rotate independently of the first cylindrical member 210 and the second cylindrical member 110 and independently of each other, each of the plurality of additional cylindrical members having flexural spokes with teeth that engage the grooves 220 along the first cylindrical member 210 when no torque is applied and that disengage from the grooves 220 when a threshold torque is applied.

Some embodiments, consistent with the present disclosure, provide a non-transitory computer-readable storage medium storing instructions describing a discrete torque limiter, wherein the instructions are readable by one or more processors adapted to print a three dimensional object, wherein the printed object is based on the instructions for the discrete torque limiter, and wherein the instructions include a description of the discrete torque limiter that comprises a first cylindrical member 210 including grooves 220 along a longitudinal surface of the first cylindrical member 210. In these embodiments, the instructions can further describe the discrete torque limiter having a second cylindrical member 110 arranged concentrically with the first cylindrical member 210, the second cylindrical member 110 being adapted to move independently around the first cylindrical member 210 and including flexural spokes 120 with teeth 125 that engage the grooves 220 along the first cylindrical member when no torque is applied and that disengage from the grooves 220 when a torque that exceeds a threshold torque is applied to the first cylindrical member 210 or second cylindrical member 110.

Reference will now be made in detail to the exemplary embodiments implemented according to the disclosure, the examples of which are illustrated in the accompanying drawings. Wherever possible, the same reference numbers will be used throughout the drawings to refer to the same or like parts.

Figure 1B:
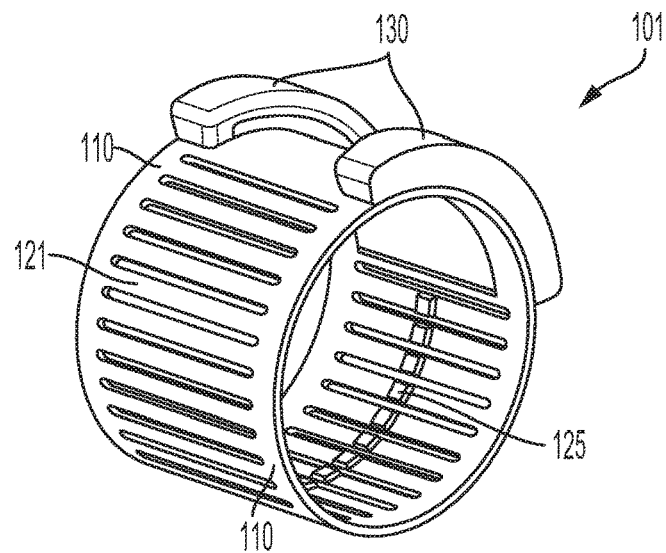

FIGS. 1A-1B are diagrams of a comb ring 100 and a double comb ring 101 that can be used to implement a clutch consistent with embodiments of the present disclosure. Both comb ring 100 and double comb ring 101 can be cylindrical tubes that can be placed around or inside of other components of the system (e.g., sleeve 200 described below in reference to FIG. 2). When engaged with other components of the system, comb ring 100 and double comb ring 101 can transfer torque to the other components.

Both comb ring 100 and double comb ring 101 can include flexural spokes (e.g., flexural spokes 120 in FIG. 1A and flexural spokes 121 in FIG. 1B) anchored on one end (as shown in FIG. 1A) or both ends (as shown in FIG. 1B) depending on the embodiment. The flexural spokes 120 can include teeth 125 that engage with additional components as described below.

Additionally, components 100 and 101 can include structures 130 that provide a way to attach components 100 and 101 to other mechanical components as described in more detail below. Structures 130 are only examples and a variety of different types of structures, geometries, or other types of connections could be used to attach components 100 and 101 to other mechanical components.

FIG. 1A depicts an exemplary comb ring 100 used for implementing embodiments of the present disclosure. Comb ring 100 can include spokes 120 anchored on one side by ring 110. Ring 110 can be a solid ring providing support for spokes 120. Spokes 120 can extend from ring 110 and the length of spokes 120 can vary depending on the specific application of comb ring 100 and the desired characteristics of comb ring 100. Specifically, the length of spokes 120 can directly affect the threshold torque that the a clutch can withstand. Changing the length of spokes 120 can allow comb ring 100 to provide different threshold levels of torque for different applications.

As shown in FIG. 1A, spokes 120 can occupy only a portion of the circumference of comb ring 100. By providing some surface area without spokes, comb ring 100 can provide surfaces that can be used for further connections with other components (e.g., using structure 130, described in more detail below). In some embodiments, connections with other components can further be included on ring 110. In some embodiments, spokes 120 occupy the entire circumference of comb ring 100.

Additionally, comb ring 100 can include groupings of spokes 120 interspersed with areas containing no spokes. Spokes 120 can be evenly distributed around the circumference of comb ring 100 or evenly distributed in the areas of comb ring 100 that contain spokes. In some embodiments, the spacing or distribution of the spokes can be variable depending on the desired characteristics and application of comb ring 100. For example, by providing groupings of spokes 120 separated by areas without spokes 120, comb ring 110 can be adapted to engage with other components of the clutch system at specified rotational positions. In this example, rotational energy is transferred to the other components only when comb ring 100 is engaged at those particular positions and no rotational energy is transferred otherwise.

Moreover, having multiple areas without spokes can allow for additional points of engagement with additional components of the system or multiple points of engagement with the same component of a system. These areas can engage other components through, for example, structures 130 or other mechanisms. Accordingly, different configurations of spoke layout can adapt to different types of systems and connection.

Spokes 120 can include teeth 125 protruding from the surface of spokes 120. As shown in FIG. 1A, the teeth can extend inward from the inner surface of spokes 120 and comb ring 100. In some embodiments, the teeth extend outward from the outer surface of spokes 120 and comb ring 100. The geometry of teeth 125 can vary depending on the application of comb ring 100 and can be designed to interact with complementary geometry of additional components (e.g., sleeve 200 described in FIG. 2 below). In some embodiments, teeth 125 are placed at the unanchored end of spokes 120.

As described, comb ring 100 can be combined with other components (e.g., sleeve 200 as described below in relation to FIG. 2) to limit torque. By engaging teeth 125 with these other components to resist free movement of comb ring 100 in relation to the other components, comb ring 100 can be part of a clutch system that transfers energy to other components of the apparatus. When teeth 125 disengage from the other components of the system, comb ring 100 can move independently of the other components preventing additional energy from transferring through comb ring 100. Comb ring 100 can be designed to disengage spokes 120 and teeth 125 from other components when a threshold level of torque is applied. Comb ring 100 can disengage from other components when the torque causes forces applied to spokes 120 cause spokes 120 to flex. The flexion of spokes 120 displaces teeth 125 removing them from the point of engagement. These specific forces are described in more detail below in relation to FIG. 4.

The flexion of spokes 120 depends both on the physical structure of comb ring 100 as well as the materials used for comb ring 100. Because flexion of the spokes allows teeth 125 to be disengaged from other components, controlling the modulus of spokes 120 can alter the performance of the clutch. Differences in the modulus of the materials used for comb ring 100, and in particular spokes 120, can affect the performance and characteristics of comb ring 100. One material can be used for all of the components of ring 100 or different materials can be used for the different individual parts of comb ring 100. For example, a non-flexible material could be used for ring 110 and teeth 125 while a flexible material can be used for spokes 120.

In some embodiments, comb ring 100 can be made out of an engineering plastic. Examples of engineering plastics include Acrylonitrile butadiene styrene (ABS), Nylon 6, Nylon 6-6, Polyamides (PA), Polybutylene terephthalate (PBT), Polycarbonates (PC), Polyetheretherketone (PEEK), Polyetherketone (PEK), Polyethylene terephthalate (PET), Polyimides, Polyoxymethylene plastic (POM/Acetal), Polyphenylene sulfide (PPS), Polypropylene (PP), Polyphenylene oxide (PPO), Polysulphone (PSU), Polytetrafluoroethylene (PTFE/Teflon), and Ultra-high-molecular-weight polyethylene (UHMWPE/UHMW). The specific material used combined with the specific geometry of the spokes and teeth will control the overall torque that can be applied to comb ring 100 before disengagement occurs.

Because spokes 120 can be flexible beams anchored on one end by ring 110 and engaged on the other end at teeth 125, models analyzing anchored cantilever beams can provide insight into the behavior of spokes 120 when forces are applied. More specifically, the amount of deflection of spokes 120 that occurs when a force is applied to the unanchored end of spokes 120 can be modeled using a cantilever beam equation taking the form $$\delta = \frac{Pl^3}{3EI}$$

where $\delta$ is the amount of deflection, P is the applied force, l is the length of spokes 120 measured at the location of teeth 125, E is elastic modulus of the material used for spokes 120, and I is the second moment of area for spokes 120. Using this formula, clutch behavior that utilizes a comb ring (e.g., comb ring 100) can be predicted for different materials and geometries.

It is also the case that increasing or decreasing the length of spokes 120 can decrease or increase the amount of force necessary to reach the same level of tooth deflection. Similarly, increasing or decreasing the stiffness of the materials used can increase or decrease the amount of force necessary to reach the same amount of tooth deflection. Additionally, modifying the shape of the spokes can alter the second moment of area and affect the calculations.

Accordingly, different physical and material choices can be made to achieve desired levels of flexion in spokes 120 while also allowing specific geometry and materials to be chosen for specific application conditions to achieve the necessary torque thresholds. Moreover, the ability to adjust physical and material characteristics can allow threshold torques to be achieved while controlling the stresses experienced by various components of comb ring 100. Limiting these stresses to below the yield stress supportable by the chosen materials and structures can help ensure that comb ring 100 will not break or fail. Accordingly, any changes to the physical or material characteristics of comb ring 100 to control threshold torques can also account for corresponding changes in the stresses experienced as a result. Just as analysis of the materials and structure of comb ring 100 can provide insight into the behavior of spokes 120, additional analysis can predict the loading stresses on spokes 120 that can occur when torque is applied to comb ring 100. This analysis can ensure that the maximum stresses that occur up to the disengagement of teeth 125 remain below a yield stress of failure for the chosen materials. The stresses on comb ring 100 can be modeled using the equation $$\sigma = \frac{Plh}{2I}$$

where σ is the amount of stress experienced by spokes 120, P is the applied force, l is the length of spokes 120 measured at the location of teeth 125, h is the thickness of spokes 120, and I is the second moment of area for spokes 120. This formula can be used to model the effect of both radial and tangential forces (discussed in more detail below in reference to FIG. 4). When using radial forces, P is the radial force and h is the radial thickness of spokes 120. When using tangential forces, P is the tangential force and h is the tangential width of spokes 120. Analyzing the stress experienced by spokes 120 and comb ring 100 can help ensure that a specific combination of geometries, physical characteristics, and materials used in a clutch will not result in load stresses above the yield stress levels for a material and can help ensure that the components of a clutch (e.g., spokes 120) will not break during operation.

FIG. 1B depicts an exemplary double comb ring 101 used for implementing embodiments of the present disclosure. Similarly to the comb ring described in relation to FIG. 1A, double comb ring 101 can be a hollow tube that can allow double comb ring 101 to be placed around other components. Double comb ring 101 can also be placed inside of other components.

Similarly to comb ring 100, double comb ring 101 can include spokes 121. Spokes 121 of double comb ring 101 can be anchored on both sides of double comb ring 101 by rings 110. The length of spokes 121 can vary depending on the specific application desired characteristics for comb ring 101.

As shown in FIG. 1B, and similarly to comb ring 100 shown in FIG. 1A, spokes 121 can occupy only a portion of the circumference of comb ring 101. Moreover, comb ring 101 can have a portion of surface area without any spokes that can be used for various purposes, such as connecting double comb ring 101 to other components. In some embodiments, this area can utilize structures such as structures 130 to connect to other components.

As with comb ring 100, double comb ring 101 can have spokes 121 that occupy the entire circumference of comb ring 101, that are organized into groups of spokes 121 interspersed with areas containing no spokes, or that are evenly distributed around the circumference of double comb ring 101 or the areas of double comb ring 101 that contain spokes 121. In some embodiments, the spacing or distribution of spokes 121 can vary depending on the desired characteristics and application of comb ring 101.

Spokes 121 can also include teeth 125 protruding from the surface of spokes 121. As shown in FIG. 1B, teeth 125 can extend inward from the inner surface of spokes 121 and comb ring 101. In some embodiments, teeth 125 extend outward from the outer surface of spokes 121 and comb ring 101. Teeth 125 of comb ring 101 can, in some embodiments, have the same geometry and structure as teeth 125 of comb ring 100 shown in FIG. 1A. Teeth 125 can be anywhere along the length of spokes 121. In some embodiments, teeth 125 can be in the middle of spokes 121.

As described, double comb ring 101 can be combined with other components (e.g., sleeve 200 as described below in relation to FIG. 2) to limit torque. Similarly to comb ring 100, by engaging teeth 125 with these other components to resist free movement of double comb ring 101 in relation to the other components, double comb ring 101 can be part of a clutch system that transfers energy to other components of a device. When teeth 125 disengage from the other components of the device, double comb ring 101 can move independently of the other components preventing additional energy from transferring through double comb ring 101, effectively limiting the torque applied to components connected to double comb ring 101. Double comb ring 101 can disengage from other components when forces applied to spokes 121 cause spokes 121 to flex, removing teeth 125 from the point of engagement. These forces are described in more detail below.

As previously described in relation to comb ring 100, the flexion of spokes 121 depends both on the physical structure of double comb ring 101 as well as the materials used for double comb ring 101. Because flexion of spokes 121 allows for disengaging teeth 125 from other components, controlling the flexibility of spokes 121 can alter the performance of the clutch. As with comb ring 100, differences in the flexibility of the materials used for double comb ring 101, and in particular spokes 121, can affect the performance and characteristics of double comb ring 101.

One material can be used for all of the components of double comb ring 101 or different materials can be used for each of the different components. For example, a non-flexible material could be used for rings 110 and teeth 125 while a flexible material can be used for spokes 121. In some embodiments, double comb ring 101, like comb ring 100, can be made out of an engineering plastic.

Because spokes 121 can be flexible beams anchored on both ends by rings 110 and engaged in the center by teeth 125, models analyzing beams fixed on both ends with a center load can provide insight into the behavior of spokes 121 when forces are applied to teeth 125. More specifically, the amount of deflection of spokes 121 that occurs when a force is applied to spokes 121 at teeth 125 can be modeled using a beam equation taking the form $$\delta = \frac{Pl^3}{192EI}$$

where δ is the amount of deflection, P is the applied force, l is the length of spokes 121, E is elastic modulus of the material used for spokes 121, and I is the second moment of area for spokes 121. For double comb ring 101, and in contrast to comb ring 100 described above, the length of spokes 121 is determined by measuring the full length of spokes 121 from its intersections with rings 110 and is not based on the distance as measured from one side of spokes 121 to teeth 125.

Similarly to comb ring 100, the behavior of double comb ring 101 can be predicted and controlled for different materials and physical attributes using the above formula for beam flexion. For example, increasing or decreasing the length of spokes 121 can decrease or increase the amount of force necessary to reach the same amount of deflection. Similarly, increasing or decreasing the stiffness of the materials used can increase or decrease the amount of force necessary to reach the same amount of deflection.

Accordingly, as with comb ring 100, different physical and material choices can be made for double comb ring 101 to achieve desired levels of flexion in spokes 121 while also allowing specific geometry and materials to be chosen for specific application conditions to achieve the necessary torque thresholds. As with comb ring 100, the ability to adjust physical and material characteristics of double comb ring 101, can allow threshold torques to be achieved while controlling the stresses experienced by various components of double comb ring 101. Limiting these stresses to below the yield stress supportable by the chosen materials and structures can help ensure that double comb ring 101 will not break or fail. Similarly to comb ring 100, any changes to the physical or material characteristics of double comb ring 101 to control threshold torques can also account for corresponding changes in the stresses experienced as a result.

As with comb ring 100, additional analysis of double comb ring 101 can predict the loading stresses on spokes 121 that can occur when torque is applied to double comb ring 101. This analysis can ensure that the maximum stresses that occur up to the disengagement of teeth 125 remain below a yield stress of failure for the chosen materials. The stresses on double comb ring 101 can be modeled using the equation $$\sigma = \frac{Plh}{16I}$$

where $\sigma$ is the amount of stress experienced by spokes 121, P is the applied force, l is the length of spokes 121, h is the thickness of spokes 121, and I is the second moment of area for spokes 121. For double comb ring 101, and in contrast to comb ring 100 described above, the length of spokes 121 is determined by measuring the full length of spokes 121 from their intersections with rings 110 and is not based on the distance as measured from one side of spokes 121 to teeth 125. As with comb ring 100, this formula can be used to model the effect of both radial and tangential forces (discussed in more detail below in reference to FIG. 4). When using radial forces, P is the radial force and h is the radial thickness of spokes 121. When using tangential forces, P is the tangential force and h is the tangential width of spokes 120. Analyzing the stress experienced by spokes 121 and double comb ring 101 can help ensure that a specific combination of geometries, physical characteristics, and materials used in a clutch will not result in load stresses above the yield stress levels for a chosen material and can help ensure that the components of a clutch (e.g., spokes 121) will not break during operation.

Although comb ring 100 and double comb ring 101 are described and shown in FIGS. 1A-1B as distinct components that are connectable to other components in a system, it is appreciated that comb ring 100 and double comb ring 101 can be part of larger components that are not pictured or described while still preserving the structure and operation described above.

Figure 2:
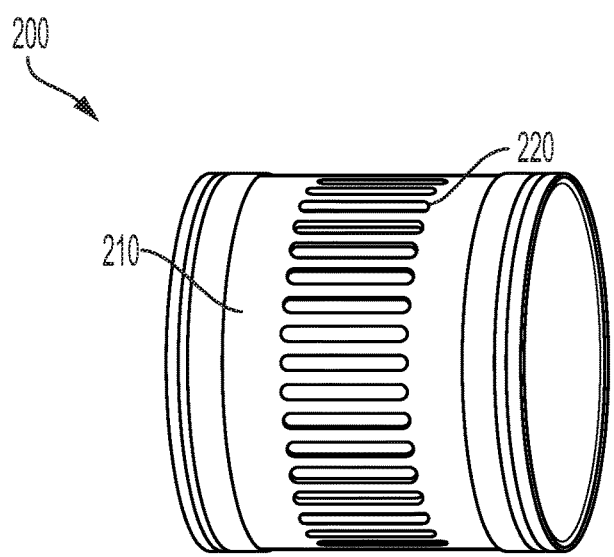
FIG. 2 is a diagram of a component of an exemplary apparatus for implementing embodiments consistent with the present disclosure.

FIG. 2 is a diagram of a sleeve 200 that can be used to implement a clutch consistent with embodiments of the present disclosure. Sleeve 200 can include a hollow tube 210. Hollow tube 210 can connect to additional mechanical components (as described in relation to FIG. 3B below). Sleeve 200 can also include grooves 220 that can be cut into hollow tube 210 designed to engage with teeth 125 of comb ring 100 or double comb ring 101 shown in FIGS. 1A-1B.

Figure 3A:
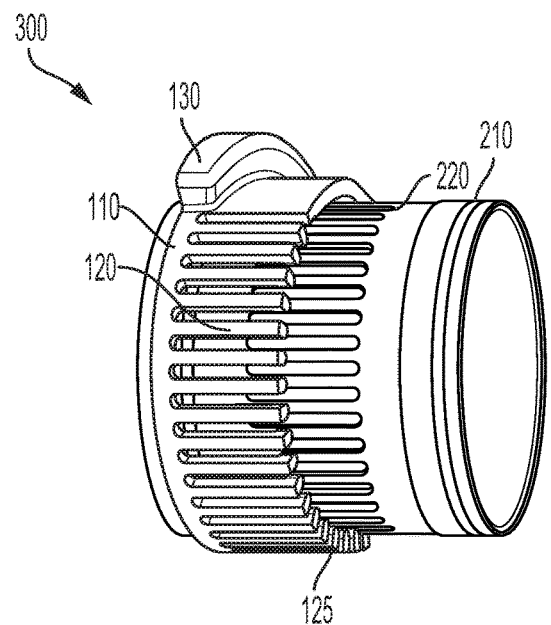
FIGS. 3A-3D are diagrams of an exemplary apparatus for implementing embodiments consistent with the present disclosure.
Figure 3B:
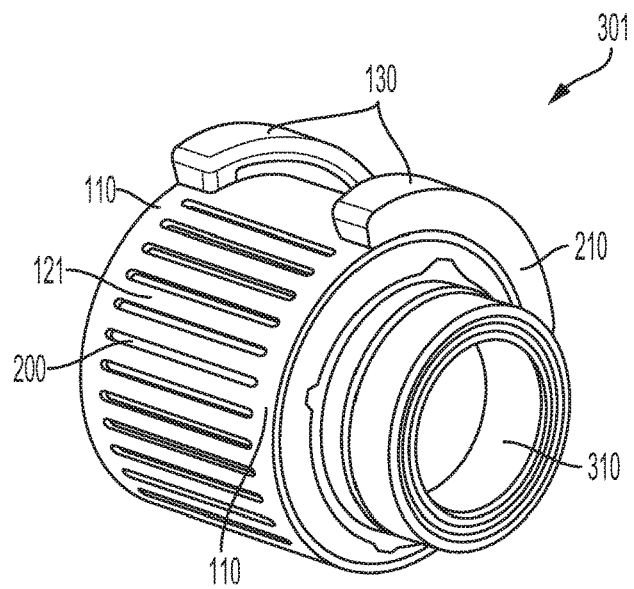
Figure 3C:
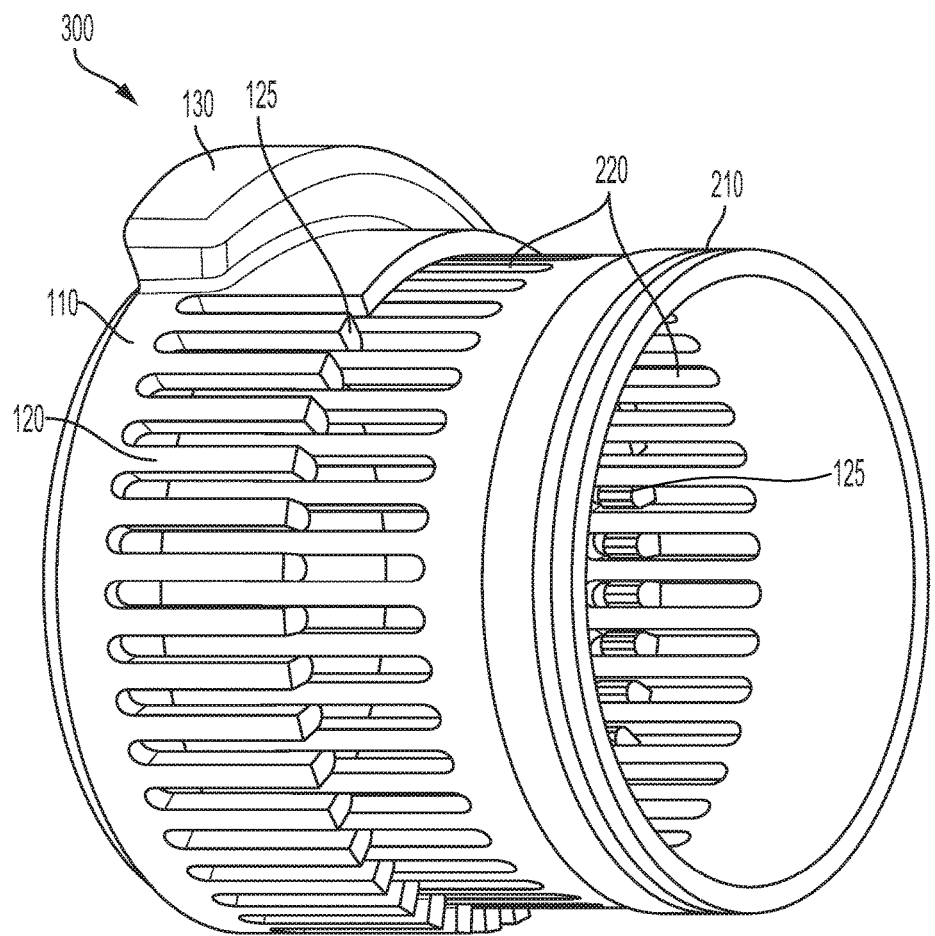
Figure 3D:
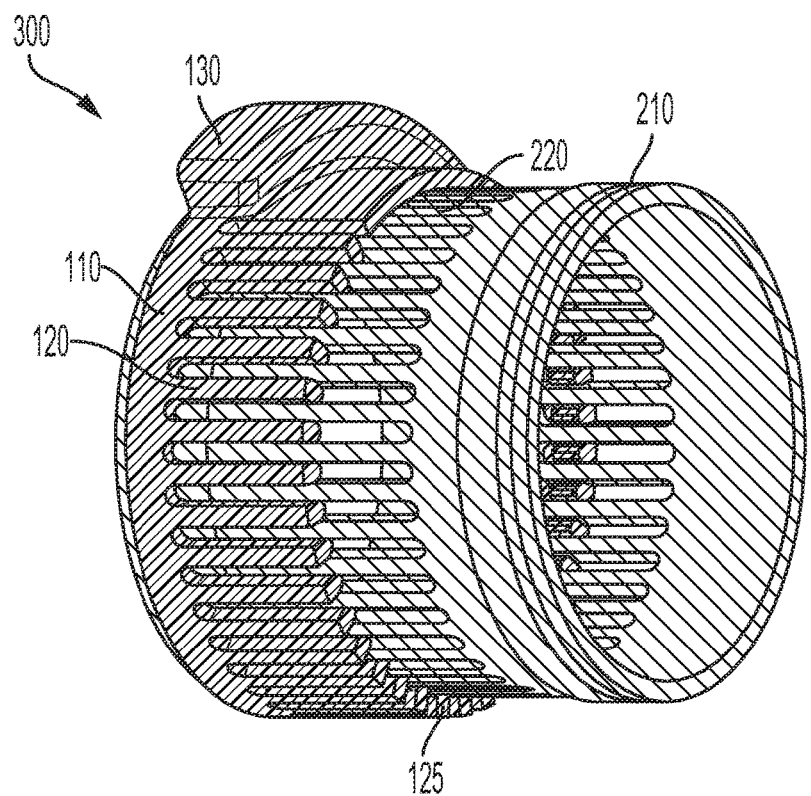

It is appreciated that although sleeve 200 is represented in FIG. 2 and FIGS. 3A-3B as a hollow tube, in some embodiments, sleeve 200 is instead a solid cylinder or any other component having a cylindrical portion that can be placed within or around comb ring 100 or double comb ring 101.

Figure 1C:
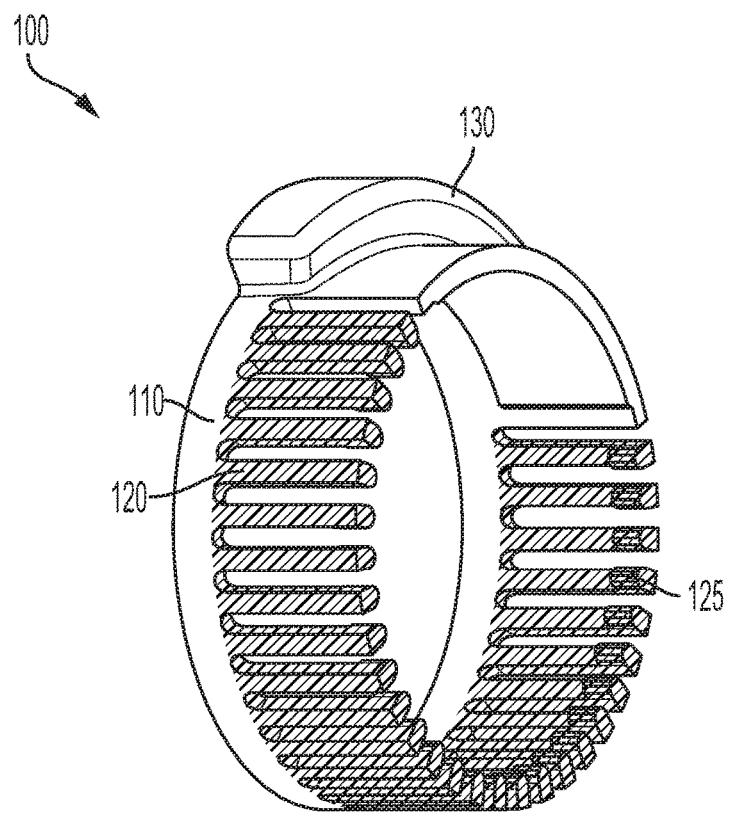

Grooves 220 can be on the inner or outer surface of sleeve 200 or on both surfaces of sleeve 200. In some embodiments, grooves 220 can be slots that extend through sleeve 200 and creating openings on both the inner and outer surfaces. The surface or surfaces used for grooves 220 can depend on the geometry of the complementary comb ring (e.g., comb ring 100 or double comb ring 101 of FIGS. 1A-1B) intended to engage with sleeve 200. When, for example, comb ring 100 of FIG. 1 surrounds sleeve 200, teeth 125 protrude from the inner surface of spokes 120 and engage with grooves 220 on the outer surface of sleeve 200. The specific interaction between comb ring 100 or double comb ring 101 and sleeve 200 is described in more detail in relation to FIGS. 3A-3B below.

Sleeve 200 can include grooves 220 on the entire surface area of hollow tube 210 or can include grooves 220 on only portions of the surface area of hollow tube 210. In some embodiments, grooves will be evenly spaced and/or evenly distributed on the surface of hollow tube 210. Additionally, hollow tube 210 can include groupings of grooves 220 interspersed with areas containing no grooves. In some embodiments, the spacing and distribution of grooves 220 will correspond with the spacing and distribution of a comb ring or double comb ring (e.g., comb ring 100 or double comb ring 101 of FIGS. 1A-1B) designed to work with sleeve 200. In some embodiments the spacing and distribution of grooves 220 can be independent of any other component such as comb ring 100 or comb ring 101. Moreover, the spacing and distribution of grooves 220 can be designed to complement a specific comb ring 100 or double comb ring 101 spoke distribution in order to provide the desired torque limitation behavior.

FIGS. 3A-3B are diagrams of exemplary clutches 300 and 301 consistent with embodiments of the present disclosure. Clutches 300 and 301 include a comb ring and double comb ring (e.g., comb ring 100 and double comb ring 101 from FIGS. 1A-1B) respectively combined with a sleeve (e.g., sleeve 200 from FIG. 2).

FIG. 3A is a diagram of clutch 300. Clutch 300 can also be referred to as a discrete torque limiter. Clutch 300 can consist of comb ring 100 which includes ring 110 anchoring spokes 120. Clutch 300 can further include sleeve 200 that can have grooves 220 cut into hollow tube 210. Clutch 300 can be formed by sliding comb ring 100 over sleeve 200. Comb ring 100 and sleeve 200 can be aligned in such a way that teeth 125 can engage with grooves 220 effectively connecting comb ring 100 with sleeve 200. By engaging comb ring 100 with sleeve 200, rotating either comb ring 100 or sleeve 200 can cause the other component to rotate based on the engagement of teeth 125 with grooves 220. Additionally, clutch 300 can utilize structure 130 of comb ring 100 to connect to other components of the system.

As torque is applied to comb ring 100 or sleeve 200, forces at the point of contact of teeth 125 and grooves 220 can cause various forces to be exerted on spokes 120. These specific forces are described in more detail below in relation to FIG. 4. The forces applied can cause energy to be transferred between comb ring 100 and sleeve 200 and can cause both components to rotate.

In addition to causing rotation, the forces applied to clutch 300 can cause deflection in spokes 120. As previously described, the amount of deflection of spokes 120 can be dependent on both the material and physical characteristics of spokes 120, teeth 125, and grooves 220. At a certain threshold level of torque applied to clutch 300, the force placed on spokes 120 as a result of the engagement of teeth 125 with grooves 220 can cause enough deflection in spokes 120 to disengage teeth 125 from grooves 220.

After disengaging, comb ring 100 can rotate independently of sleeve 200. During this independent rotation, where spokes 120 of comb ring 100 are no longer aligned with grooves 220 of sleeve 200, the forces resulting from the engagement of teeth 125 and grooves 220, can subside. This can result in reduced deflection of spokes 120 and teeth 125 can re-engage with grooves 220 when one of the components rotates back to position where spokes 120 and grooves 220 are aligned.

If the level of torque being applied to clutch 300 has not reduced, flexural forces can again cause deflection of spokes 120 when teeth 125 reengage with grooves 220. This can cause a repeat in the cycle of disengagement, rotation, and reengagement effectively preventing clutch 300 from transferring the torque between comb ring 100 and sleeve 200. After the torque applied to clutch 300 drops below a threshold level, the flexural forces on spokes 120 at reengagement can no longer cause enough deflection to disengage teeth 125 from grooves 220 and can allow comb ring 100 and sleeve 200 to remain engaged.

Because of the described cycle of disengagement, rotation, and reengagement, the energy that is transferred between a component connected to comb ring 100 (e.g., through structure 130) and sleeve 200 can be limited to a threshold torque at which the various forces cause disengagement. As previously described, many factors, such as materials used, the length of spokes 120, and the specific geometry of teeth 125 and grooves 220, can affect the threshold torque that clutch 300 can tolerate before disengagement occurs. These specific forces and specific teeth geometries are described in more detail in relation to FIG. 4 below.

FIG. 3B is a diagram of clutch 301. Clutch 301 can also be referred to as a discrete torque limiter. Clutch 301 can consist of double comb ring 101 which includes rings 110 that anchor spokes 121. Clutch 301 can further include sleeve 200 that can have grooves 220 (hidden from view in FIG. 3B) cut into hollow tube 210. Similarly to clutch 300, clutch 301 can be formed by sliding double comb ring 101 over sleeve 200. Double comb ring 101 and sleeve 200 can be aligned in such a way that teeth 125 can engage with grooves 220 effectively connecting double comb ring 101 with sleeve 200. By engaging double comb ring 101 with sleeve 200, rotating either double comb ring 101 or sleeve 200 can cause the other component to rotate based on the engagement of teeth 125 with grooves 220. As with clutch 300, clutch 301 can utilize structures 130 of double comb ring 101 to connect to other components of the system. Additionally, clutch 301 can connect to component 310 by placing component 310 inside of sleeve 200. In some embodiments, component 310 can be part of sleeve 200.

Clutch 301 can operate in the same or similar manner as clutch 300. When rotational force is applied to either sleeve 200 or double comb ring 101, forces at the point of contact of teeth 125 and grooves 220 can transfer energy between double comb ring 101 and sleeve 200. Similarly to clutch 300, the engagement between teeth 125 and grooves 220 can cause both double comb 101 and sleeve 200 to rotate simultaneously.

As described in relation to FIG. 3A, the forces applied to clutch 301 can cause deflection in spokes 121. The deflection can be based on the material and physical characteristics of spokes 121, teeth 125, and grooves 220. Deflection of spokes 121 of clutch 301 can occur in the same manner and as a result of the same forces as described in relation to spokes 120 of clutch 300. At a certain threshold level of torque applied to clutch 301, the force exerted on spokes 121 as a result of the engagement of teeth 125 with grooves 220 can cause enough deflection in spokes 121 to disengage teeth 125 from grooves 220. After disengaging, comb ring 101 can rotate independently of sleeve 200. During this independent rotation, where spokes 121 of comb ring 101 are no longer aligned with grooves 220 of sleeve 200, the forces resulting from the engagement of teeth 125 and grooves 220, can subside. This can result in reduced deflection of spokes 121 and teeth 125 can re-engage with grooves 220 when one of the component rotates back to position where spokes 121 and grooves 220 are aligned.

If the level of torque being applied to clutch 301 has not reduced, flexural forces can again cause deflection of spokes 121 when teeth 125 reengage with grooves 220. As with clutch 300, this can cause a repeat in the cycle of disengagement, rotation, and reengagement effectively preventing clutch 301 from transferring the torque between double comb ring 101 and sleeve 200. After the torque applied to clutch 301 drops below a threshold level, the flexural forces on spokes 120 at reengagement may no longer cause enough deflection to disengage teeth 125 from grooves 220 and can cause double comb ring 101 and sleeve 200 to remain engaged.

Because of the described cycle of disengagement, rotation, and reengagement, the energy that is transferred between a component connected to double comb ring 101 (e.g., through structures 130) and sleeve 200 can be limited to a threshold torque at which the various forces cause disengagement. As previously described, many factors, such as materials used, the length of spokes 121, and the specific geometry of teeth 125 and grooves 220, can affect the threshold torque that clutch 301 can tolerate before disengagement occurs. Because spokes 121 are anchored on both sides of double comb ring 101 at rings 110, double comb ring can withstand a much higher threshold of torque before disengagement than clutch 300 when using similar materials and teeth 125 geometries. This increased threshold torque, however, can also correspond to higher stress forces that can result in failure or breakage of the double comb ring 101 components before the threshold torque causes disengagement. Accordingly, adjustments to the materials and geometries used for double comb ring 101 can be made to provide increased torque while controlling the resulting load stresses.

For example, if the same materials and geometries are used, double comb ring 101 can require eight times the torque of comb ring 100 to reach disengagement. In this example, however, the stress forces produced in comb ring 101 can be twice the stress force produced in comb ring 100 for the same materials and geometries. Because the threshold torque in double comb ring 101 increases at four times the rate of the stress when compared with comb ring 100, an alternative geometry can be used with double comb ring 101 to limit the stress to the same level as comb ring 100 while providing four times the torque threshold. Alternatively, double comb ring 101 can be modified to provide the same torque as comb ring 100 but with lower overall stress levels.

Figure 4:
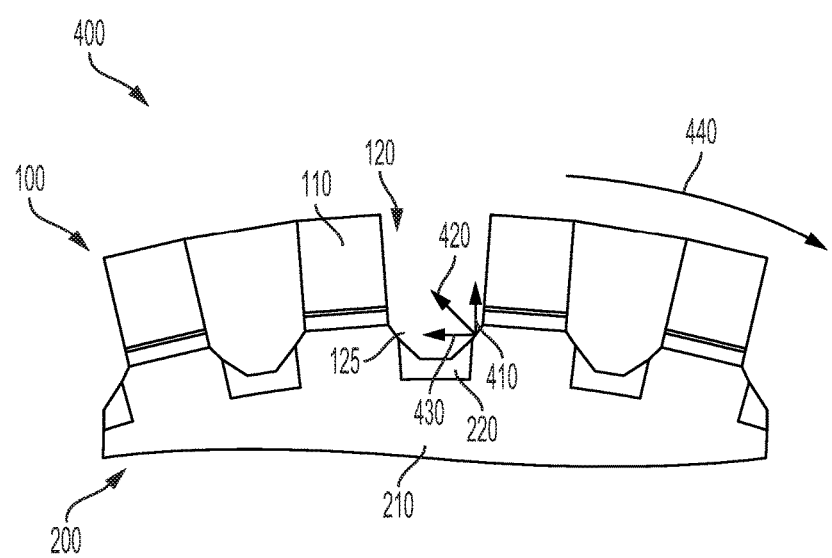
FIG. 4 is a diagram of a cross-section of an exemplary apparatus for implementing embodiments consistent with the present disclosure.

FIG. 4 is a cross section 400 of a clutch consistent with embodiments of the present disclosure. The clutch shown in cross section 400 can be clutch 300 of FIG. 3. Although subsequent description of cross section 400 and the calculations of the forces involved are specific to clutch 300, it is appreciated that a similar description also applies to clutch 301 of FIG. 3B. Cross section 400 can show comb ring 100 having spokes 120 anchored by ring 110. Moreover, teeth 125 can protrude inward from spokes 120. Cross section 400 can also show sleeve 200 having hollow tube 210 and grooves 220. Cross section 400 can show the point of engagement of teeth 125 with grooves 220. Additionally, cross section 400 can show the radial force 410, contact force 420, and tangential force 430, that can occur when torque 440 is applied to comb ring 100. Although not shown in FIG. 4, radial force 410, contact force 420, and tangential force 430 can also occur when torque is applied to sleeve 200 in a direction opposite of torque 440. Although, cross section 400 only depicts forces being applied to one of teeth 125, it is appreciated that the same forces can apply to all spokes 120 that contact grooves 220 through teeth 125.

If a torque in the opposite direction of torque 440 is applied to comb ring 100, forces mirroring those of radial force 410, contact force 420 and tangential force 430 can occur on the opposite edge of teeth 125. In some embodiments, the geometry of the left side of teeth 125 can differ from the geometry of the right side of teeth 125 resulting in forces at each side of contact that have differing magnitudes or directions and produce different behavior depending on the direction in which the torque is applied.

As shown in FIG. 4, torque 440 applied to comb ring 100 can transfer through ring 110 and spokes 120 causing teeth 125 to press against sleeve 200 at the point of contact between teeth 125 and grooves 220. When teeth 125 are engaged with grooves 220, the torque can be transferred through the point of contact between teeth 125 and grooves 220 causing sleeve 200 and comb ring 100 to rotate together. This transfer of energy between comb ring 100 and sleeve 200, can cause contact force 420.

Contact force 420 can be the resultant or normal force that occurs as a result of the contact between teeth 125 and grooves 220. For the purposes of analysis, contact force 420 can be resolved into radial force 410 and tangential force 430. Analysis of the radial force 410 and tangential force 430 can predict the behavior of the clutch as a result of contact force 420 and torque 440.

Radial force 410 can represent forces pushing against spokes 120 causing spokes 120 to flex away from the point of contact between teeth 125 and grooves 220. The amount of deflection of spokes 120 necessary to disengage teeth 125 from grooves 220 is dependent on the materials and physical characteristics of spokes 120 and can be calculated using the formulas described in relation to FIGS. 1A-1B. As torque 440 increases, the radial forces 410 placed on spokes 120 can also increase.

The minimum radial force 410 that can be exerted on teeth 125 and spokes 120 to cause disengagement can be modeled by rearranging the formula used to calculate deflection. The minimum force necessary to disengage teeth 125 from grooves 220 can be calculated using the equation $$P = \frac{3\delta EI}{l^3}$$

where P is the minimum force, $\delta$ is the amount of deflection necessary to disengage teeth 125 from grooves 220, l is the length of spokes 120, E is elastic modulus of the material used for spokes 120, and I is the second moment of area for spokes 120.

Accordingly, modifying the geometry teeth 125 related to grooves 220 can affect the amount of force necessary to disengage spokes 120. For example, increasing the depth at which teeth 125 engage grooves 220 can cause an increase in the deflection needed to disengage teeth 125. This increase in necessary deflection corresponds to an increase in the radial force 410 necessary to deflect spokes 120 the required distance to disengage teeth 125. Additionally, the length of spokes 120 has an inverse cubic relationship with the necessary radial force 410. Increasing the length of spokes 120 can decrease the force necessary to deflect spokes 120 the required amount.

Additionally, radial force 410 can be used to determine the level of stress that is placed on spokes 120 and teeth 125 as described above in reference to FIGS. 1A-1B. If materials are chosen that can withstand less force before breaking than what is necessary to disengage teeth 125 from grooves 220, spokes 120 can break before disengagement. Choosing different materials, physical characteristics and geometries for spokes 120 and teeth 125 can allow for comb ring 100 to withstand radial force 410 without breaking.

Tangential force 430 is a force that is exerted on teeth 125 and spokes 120 in a direction that is perpendicular to radial force 410. Because teeth 125 can be engaged with grooves 220, tangential force 430 can represent the force that results in the rotation of comb ring 100 and sleeve 200. Accordingly, tangential force 430 can represent the force of the torque being applied to clutch 300. The total torque that the clutch can withstand before teeth 125 disengage from grooves 220 can be calculated by summing the tangential force 430 that is placed on each of spokes 120.

The maximum tangential force 430 that spokes 120 can generate can be based on the maximum radial force 410 that occurs before spokes teeth 125 disengage from grooves 220 as a result of radial force 410 causing deflection in spokes 120. The tangential force 430 can be calculated using a trigonometric function having the form $$F_t = \frac{F_r}{\tan(\theta)}$$

where $F_t$ is tangential force 430, $F_r$ is the radial force 410 necessary to disengage teeth 125 from grooves 220, and $\theta$ is the angle of contact measured from the surface of the teeth 125 to the wall of grooves 220.

Because tangential force 430 is exerted only as long as teeth 125 are engaged with grooves 220, the maximum value tangential force 430 is limited, in part, by radial force 410. Moreover, tangential force 430 changes based on the angle of contact measured from the surface of teeth 125 to the wall of grooves 220. In some embodiments the angle of contact is between 30° and 45° and is constant throughout flexion of spokes 120.

Changing the angle of contact can affect the behavior of clutch 300. Increasing the angle of contact can result in a decrease in tangential force 430. This decrease can reduce the stress placed on spokes 120, but, because the overall torque clutch 300 can maintain is dependent on tangential force 430, the decrease in tangential force 430 can also decrease the overall torque that can be applied to clutch 300 before disengagement of teeth 125 occurs. Conversely, decreasing the angle can result in increases in tangential force 430 that can correspond to both increased stress on the components and increased overall torque before disengagement of teeth 125.

The angle of contact for both sides of teeth 125 can be the same resulting in similar clutching behavior when torque is applied in either the direction of torque 440 or in the direction opposite of torque 440. In some embodiments, the geometry of teeth 125 can be modified to produce different behavior depending on the torque direction. For example, if one side of teeth 125 has a different contact angle than the opposite side of teeth 125, the clutch can withstand more or less torque applied in one direction than the other. If the left side of teeth 125 as shown in FIG. 4 has a higher contact angle than the right side of teeth 125 than the clutch shown in FIG. 4 will withstand more overall torque in the direction of torque 440 than when torque is applied in the opposite direction of torque 440.

In some embodiments, the geometry of one or both sides of teeth 125 can provide a changing contact angle as spokes 120 deflects and the point of contact between teeth 125 and grooves 220 changes. As torque (e.g., torque 440) increases and the deflection of spokes 120 occurs, the various forces can change based on the changing contact angle resulting in varied behavior. For example, this type of geometry can result in a clutch that provides a springy feel or cushioning before the maximum torque is reached which can reduce sudden changes in rotational speed at disengagement.

Moreover, in some embodiments, grooves 220 can taper along the longitudinal length of sleeve 200. In these embodiments, the depth at which spokes 120 engage with grooves 220 can change depending on the location at which teeth 125 engage with grooves 220 along the longitudinal axis of sleeve 200. A narrower section of grooves 220 can result in a decreased depth of the engagement of teeth 125. By decreasing the depth of engagement, less radial force 410 can be required to reach the necessary deflection to disengage teeth 125 from grooves 220. Conversely increasing the depth of engagement can result in requiring more radial force 410 to reach the necessary deflection for disengagement. Because the maximum radial force affects the overall torque clutch 300 can withstand, tapered grooves can allow for adjustment in the desired torque threshold by moving comb ring 100 longitudinally in relation to sleeve 200.

As described above, adjusting the materials and physical characteristics of the various components can affect the performance and behavior of the various components. By providing multiple ways to adjust the torque threshold, embodiments consistent with the present disclosure can be adapted to a wide range of applications and operating conditions.

In the preceding specification, various exemplary embodiments and features have been described with reference to the accompanying drawings. It will, however, be evident that various modifications and changes may be made thereto, and additional embodiments and features may be implemented, without departing from the broader scope of the invention as set forth in the claims that follow. The specification and drawings are accordingly to be regarded in an illustrative rather than restrictive sense.

For example, advantageous results still could be achieved if components in the disclosed systems were combined in a different manner and/or replaced or supplemented by other components. Moreover, while embodiments of the present disclosure have been described with reference to discrete torque limiters, other implementations are also within the scope of the following exemplary claims.

Therefore, it is intended that the disclosed embodiments and examples be considered as exemplary only, with a true scope of the present disclosure being indicated by the following claims and their equivalents.

What is claimed is:

1. A discrete torque limiter comprising:
a first cylindrical member including an inner surface, an outer surface, and grooves along the first cylindrical member, wherein the grooves comprise slots that extend through the first cylindrical member creating openings on the inner surface and the outer surface of the first cylindrical member; and
a second cylindrical member arranged concentrically with the first cylindrical member, the second cylindrical member being adapted to move independently of the first cylindrical member and including flexural spokes 120 with teeth that engage the grooves along the first cylindrical member when no torque is applied and that disengage from the grooves when a torque that exceeds a threshold torque is applied to the first cylindrical member or second cylindrical member.

2. The discrete torque limiter of claim 1, wherein, when the threshold torque is applied, flexion in the spokes cause the teeth to disengage.

3. The discrete torque limiter of claim 1, wherein the second cylindrical member comprises a comb ring, wherein the flexural spokes comprise flexible beams anchored that are connected to the comb ring at one end of the the flexible beams, and wherein the teeth are disposed on an other end of the flexible beams.

4. The discrete torque limiter of claim 1, wherein the second cylindrical member comprises two comb rings, and wherein the flexural spokes are connected to the two comb rings at both ends of the spokes.

5. The discrete torque limiter of claim 1, wherein the flexural spokes are made with an engineering plastic.

6. The discrete torque limiter of claim 1, wherein the teeth contact the grooves at a constant angle throughout engagement.

7. The discrete torque limiter of claim 1, wherein the second cylindrical member surrounds the first cylindrical member.

8. A system for limiting torque comprising:
first and second cylindrical members arranged concentrically wherein:
the first cylindrical member includes an inner surface, an outer surface, and grooves, wherein the grooves comprise slots that extend through the first cylindrical member creating openings on the inner surface and the outer surface of the first cylindrical member;
the second cylindrical member is adapted to rotate independently from the first cylindrical member; and
the second cylindrical member includes flexural spokes with teeth that engage the grooves along the first cylindrical member when no torque is applied and that disengage from the grooves when a torque that exceeds a threshold torque is applied to the first cylindrical member or second cylindrical member.

9. The system of claim 8, wherein, when the threshold torque is applied, flexion in the spokes cause the teeth to disengage.

10. The system of claim 8, wherein the flexural spokes are made with an engineering plastic.

11. The system of claim 8, wherein the first cylindrical member and second cylindrical member are made of different materials.

12. The system of claim 8, wherein the first cylindrical member and second cylindrical member are made of the same materials.

* * * * *